United States Patent

Gimaev et al.

[11] Patent Number: 5,833,835
[45] Date of Patent: Nov. 10, 1998

[54] METHOD AND APPARATUS FOR ELECTROCHEMICAL MACHINING BY BIPOLAR CURRENT PULSES

[75] Inventors: Nasich Z. Gimaev; Aleksandr N. Zajcev; Aleksandr L. Belogorskij; Igor L. Agafonov; Naila A. Amirchanova; Viktor N. Kucenko; Rafail R. Muchutdinov, all of Ufa, Russian Federation

[73] Assignee: U.S. Philips Corporation, New York, N.Y.

[21] Appl. No.: 679,025

[22] Filed: Jul. 12, 1996

[30] Foreign Application Priority Data

Jul. 18, 1995 [RU] Russian Federation ............. 95112271
Apr. 1, 1996 [EP] European Pat. Off. .............. 96200881

[51] Int. Cl.$^6$ ............................. B23H 3/00; B23H 3/02; B23H 7/32
[52] U.S. Cl. ......................... 205/645; 205/652; 205/658; 205/685; 205/654; 204/DIG. 9; 204/224 M; 204/228
[58] Field of Search ................... 205/645, 658, 205/652, 646, 653–654, 674, 685; 204/228, 224 M, DIG. 9

[56] References Cited

U.S. PATENT DOCUMENTS

| | | | |
|---|---|---|---|
| 3,357,906 | 12/1967 | Jollis et al. ............................. | 205/645 |
| 3,654,116 | 4/1972 | Inoue .................................. | 204/224 M |
| 4,264,417 | 4/1981 | Vasiliev et al. ..................... | 204/DIG. 9 |
| 4,487,671 | 12/1984 | McGeough ............................. | 205/686 |
| 4,880,509 | 11/1989 | Kuwabara et al. .................. | 204/228 X |

FOREIGN PATENT DOCUMENTS

0454081A2 10/1991 European Pat. Off. .
1440636 11/1988 U.S.S.R. .

Primary Examiner—Donald R. Valentine
Attorney, Agent, or Firm—Ernestine C. Bartlett

[57] ABSTRACT

Method of electrochemically machining an electrically conductive workpiece (2) in an electrolyte by applying bipolar electric pulses between the workpiece (2) and an electrically conductive electrode (6), one or more current pulses of normal polarity alternating with voltage pulses of opposite polarity. The amplitude (Un) of the voltage pulses is adjusted between two predetermined values (Un1, Un2) derived from the occurrence of a given surface quality of the workpiece (2) and the occurrence of wear of the electrode (6). The derivation is effected by means of at least one test which precedes the machining of the workpiece (2). During the test the amplitude (Un) of the voltage pulses is increased gradually from an initial value to a final value. The two predetermined values (Un1, Un2) are determined upon the occurrence of a sign reversal in the difference between successive values of a parameter which is representative of a property of a gap (5) between the electrode (6) and the workpiece (2). The parameter may be the amplitude (Umin) of a global minimum in the voltage across the gap (5) during the current pulses, which global minimum results from an oscillatory movement of the workpiece (2) and the electrode (6) relative to one another. The parameter may also be the integral (Qn) of the current across the gap (5) during the voltage pulses; or the integral (Fp) of the voltage across the gap (5) during the current pulses; or the resistance across the gap (5); or the size (St) of the gap (5).

32 Claims, 6 Drawing Sheets

METHOD AND APPARATUS FOR ELECTROCHEMICAL MACHINING BY BIPOLAR CURRENT PULSES

FIELD OF THE INVENTION

The invention relates to a method of electrochemically machining an electrically conductive workpiece in an electrolyte by applying bipolar electric pulses between the workpiece and an electrically conductive electrode, one or more current pulses of normal polarity being alternated with voltage pulses of opposite polarity.

BACKGROUND OF THE INVENTION

Such a method is known from Russian Patent Specification SU 1440636 A1 and can be used in the production of parts having an intricate profile or of forming tools from very strong and hard steels and alloys. During the current pulses of normal polarity the workpiece is positive relative to the electrode and the metal of the workpiece dissolves in the electrolyte, while at the same time passivation layers are formed on the surface of the workpiece. During the voltage pulses of opposite polarity the workpiece is negative relative to the electrode and depassivation of the surface occurs. At the same time, the electrolyte in the vicinity of the workpiece becomes alkaline as a result of the formation of hydrogen from water. The high pH-value causes a reaction in which the passivation layer on the workpiece dissolves. The voltage pulse of opposite polarity is followed by a pause having a length of approximately 0.5 to 2 times the duration of the voltage pulse.

A shortcoming of the known method resides in the fact that the optimum limits for changing the voltage value of the voltage pulses of opposite polarity in order to ensure a high productivity, precision and machining quality are not known. Electrode dissolution occurs, which gives rise to changes of the dimensions and shape of the electrode, as a result of which the precision and surface quality deteriorate.

SUMMARY OF THE INVENTION

U.S. Pat. No. 3,654,116 discloses an electrochemical machining method by means of bipolar pulses, in which pulses of normal polarity are alternated with pulses of opposite polarity. The amplitude and/or the duration and/or the position of the pulses of opposite polarity are controlled in such a manner that the effect of these pulses is just adequate to cancel the passivation. However, this known method does not reveal the optimum limits within which the amplitude of the pulses of opposite polarity should lie.

It is an object of the invention to provide a method with an improved precision, productivity and machining quality of the workpiece. It is another object of the invention to provide a device for carrying out the method. To this end, the method of the type defined in the opening paragraph is characterized in that the amplitude of the voltage pulses is adjusted between two predetermined values derived from the occurrence of a given surface quality of the workpiece and the occurrence of wear of the electrode, such derivation being effected by means of at least one test which precedes the machining of the workpiece.

By means of a prior test to determine the optimum limits between which the amplitude should lie, dissolution of the electrode and a consequent deterioration of the machining accuracy are precluded and, moreover, a high machining efficiency is obtained, which is attended by a well-defined surface quality, for example in the form of a lustrous finish.

When chrome-nickel steel is machined it appears that under these operating conditions a reduced concentration of hexavalent toxic chromium remains behind in the waste electrolyte solution, so that it is easier to comply with environmental requirements.

The limits within which the amplitude of the voltage pulses of opposite polarity may lie are determined by means of a variant of the method in accordance with the invention, which is characterized in that, during the test, the amplitude of the voltage pulses is increased gradually from an initial value to a final value, and in that the two predetermined values are determined upon a sign reversal in the difference between successive values of a parameter which, in operation, is representative of a property of a gap between the electrode and the workpiece.

It has been found that the occurrence of sign reversals in the difference between successive values of a parameter representative of a property of the gap between the electrode and the workpiece is a characteristic phenomenon at given amplitudes of the voltage pulses of opposite polarity. The first signal reversal appears to be the beginning of a range in which the amplitude of the voltage pulses produces a lustrous surface of the workpiece. The second sign reversal marks the instant at which the electrode begins to dissolve in the electrolyte and the machining accuracy begins to deteriorate. During the test the amplitude of the voltage pulses of opposite polarity is raised and during each of the two subsequent signal reversals the corresponding amplitude is stored. The two corresponding amplitudes then form the two predetermined values within which the machining process is continued.

If no pulses of opposite polarity are applied, the voltage between the electrode and the workpiece immediately after termination of a current pulse of normal polarity is not zero but equal to a polarization voltage which gradually decreases to zero if no further current pulses are applied. According to the invention, the amplitude of the voltage pulses during the test is increased from an initial value which substantially corresponds to the polarization voltage to a final value which is not greater than the voltage at which the electrode begins to dissolve in the electrolyte.

A first modification of the method with respect to the parameter which is representative of a property of the gap between the electrode and the workpiece may be characterized in that the parameter is the amplitude of a global minimum in the voltage across the gap during the current pulses, the global minimum resulting from an oscillatory movement of the workpiece and the electrode relative to each other. In this case the parameter is the voltage across the gap. Apart from a continuous movement between the electrode and the workpiece there is also an oscillatory movement. The electrode, for example, performs a sinusoidal movement and the workpiece is moved continuously in the direction of the oscillating electrode. The current pulses of normal polarity are applied in a time interval in which the electrode is nearest to the workpiece. During the current pulses the voltage across the gap between the electrode and the workpiece has a waveform with a global minimum. The voltage value of this global minimum appears to be dependent on the amplitude of the voltage pulses of opposite polarity. During the test the amplitude of the voltage pulses of opposite polarity is gradually increased and the difference in the voltage values of successive global minima is calculated. As soon as a sign reversal of the difference occurs the corresponding amplitude of the voltage pulses of opposite polarity is determined.

During the test the amplitude of the voltage pulses of opposite polarity may be incremented by a given step size after each current pulse of normal polarity. In the case of a comparatively small step size a measurable change in the voltage value of the successive global minima will occur only after a comparatively large number of current pulses. In this case a number of successive voltage values of the global minima will have to be compiled and averaged in order to allow a sign reversal to be detected with adequate accuracy. Generally, a sign reversal between two successive pulses will be measurable when a comparatively large step size is used. The optimum step size depends on the desired accuracy for the limits of the amplitude of the voltage pulses.

During the test a predetermined gap size is maintained. To this end, a further variant of the method is characterized in that the size of the gap between the electrode and the workpiece is controlled in such a manner that, during the current pulses, a local maximum occurs in the voltage between the workpiece and the electrode. The current pulse heats the electrolyte. When the electrode moves away from the workpiece cavitation occurs and the electrolyte begins to boil, resulting in extra bubble formation in the gap. This causes a temporary increase of the resistance of the electrolyte, which manifests itself as a local maximum in the voltage variation between the electrode and the workpiece during the current pulses.

It is also possible to use alternative properties of the gap for the parameter which is representative of a property of the gap between the electrode and the workpiece. To this end, a second modification of the method in accordance with the invention is characterized in that the parameter is the integral of the current across the gap during the voltage pulses.

In this case the instantaneous current is measured which flows through the gap between the electrode and the workpiece during the voltage pulse. The integral of this current serves as the parameter for the detection of sign reversals.

A third modification of the method is characterized in that the parameter is the integral of the voltage across the gap during the current pulses.

In this alternative method the instantaneous voltage is measured which appears across the gap between the electrode and the workpiece during the current pulses. The integral of this voltage serves as the parameter for the detection of sign reversals.

The two last-mentioned alternative methods are suitable inter alia in the case that no global minimum occurs in the voltage between the electrode and the workpiece. The absence of such a global minimum may be caused by the fact that no oscillatory movement takes place between the workpiece and the electrode. Another cause may be that an oscillatory movement is performed but that each current pulse is divided into a group of short pulses in order to preclude excessive cavitation and too high a temperature of the electrolyte. The global minimum is then not or hardly measurable.

Still further alternatives are the measurement of the resistance across the gap, in which case sign reversals in the resistance variation are detected, and the measurement of the size of the gap itself, in which case sign reversals in the variation of the gap size are detected. In the latter case a favorable value of the amplitude of the voltage pulses of opposite polarity can be determined by means of a further variant of the method, which is characterized in that, during the test, in succession, the amplitude of the voltage pulses is increased, the size of the gap between the workpiece and the electrode is measured, the difference between the measured values for a subsequent and a previous value of the gap size is computed, the amplitude of the voltage pulses is determined upon the occurrence of a sign reversal in this difference, and subsequently machining is continued with the amplitude thus determined.

It is to be noted again that in the case of said alternative properties it is no longer necessary to perform an oscillatory movement between the electrode and the workpiece.

Moreover, it is to be noted that the voltage pulses of opposite polarity may be shorter than the pauses between the current pulses of normal polarity in order to achieve the same depassivation effect of the surface to be treated.

The invention also relates to a device for electrochemically machining an electrically conductive workpiece in an electrolyte by applying bipolar electric pulses between the workpiece and an electrically conductive electrode, one or more current pulses of normal polarity being alternated with voltage pulses of opposite polarity. For carrying out the method, particularly the test in which sign reversals are detected in a parameter which is representative of a property of the gap between the electrode and the workpiece, the device is characterized in that the device comprises:

an electrode;

means for locating the electrode and the workpiece in spaced relationship so as to keep a gap therebetween;

means for feeding electrolyte into the gap between the electrode and the workpiece;

a current source, electrically connectable to the workpiece and the electrode, for supplying the current pulses to the workpiece and the electrode;

a voltage source with controllable output voltage, electrically connectable to the workpiece and the electrode, for supplying the voltage pulses to the workpiece and the electrode;

means for alternately connecting the current source and the voltage source to the workpiece and the electrode;

means for generating a control signal for gradually changing the output voltage of the voltage source;

means for analyzing and storing the voltage and/or current waveforms of the pulses between the workpiece and the electrode;

means for detecting a sign reversal in the difference between successive values of a parameter derived from the voltage waveform or the current waveform of the pulses, or from the resistance across the gap between the electrode and the workpiece;

means for storing the instantaneous value of the control signal of the voltage source upon detection of the sign reversal.

The current source supplies the current pulses necessary for the electrochemical machining of the workpiece. An ideal current source is an electric power source having a very high output impedance which supplies a given current regardless of the resistance value of the load. However, in practice the output impedance is limited but the current supplied is nevertheless highly independent of the instantaneous resistance between the electrode and the workpiece. The variation of the voltage across the gap is then dictated almost wholly by the resistance across the gap and not be the output impedance of the current source itself. Such a current source makes it possible to carry out said measurement of sign reversals in the global minimum and of sign reversals in the integral of the voltage across the gap. However, if the selected parameter is the integral of the current during the voltage pulses it is not necessary for the current source to have a high output impedance. As a matter of fact, the waveform of the voltage during the current pulses of normal polarity does not play a part in the measurement of the current during voltage pulses of opposite polarity. It follows that under given conditions the output impedance of the current source may be so low that the current source behaves as a voltage source.

The voltage source supplies the voltage pulses of opposite polarity necessary for depassivation of the workpiece surface. An ideal voltage source is an electric power source having a very low output impedance and supplying a given voltage regardless of the resistance of the load. However, in practice the output impedance is limited but the voltage supplied is highly independent of the instantaneous resistance between the electrode and the workpiece. The variation of the current through the gap is then dictated almost wholly by the resistance across the gap and not by the output impedance of the voltage source itself. Particularly when the integral of the current during the voltage pulses of opposite polarity is measured it is desirable to have a voltage source with a low output impedance. When sign reversals in the global minimum and sign reversals in the integral of the voltage across the gap during the current pulses of normal polarity are measured, the waveform of the current during the voltage pulses of opposite polarity plays a subordinate part. The output impedance of the voltage source may then be so high that the voltage source behaves as a current source.

The output voltage of the voltage source is controllable in order to allow the gradual variation of the amplitude of the voltage pulses during the test. The current source and the voltage source are alternately connected to the electrode and the workpiece and thus produce a bipolar pulse train. If the electrode and the workpiece perform an oscillatory movement relative to one another, the pulse train is preferably synchronized with the oscillation in such a manner that the center of the current pulse coincides with the point of closest approach between the electrode and the workpiece.

The variation of the current through and/or the voltage across the gap between the electrode and the workpiece is measured as a function of time and is stored in a memory. The current and the voltage are preferably measured by means of analog-to-digital converters coupled to a computer in which the measurement data is stored. By analyzing the measurement data the computer calculates and detects a sign reversal in the variation of the measured parameter. The computer also generates a control signal for controlling the output voltage of the voltage source. During the test the output voltage of the voltage source is gradually varied under command of the control signal from the computer. As soon as the computer detects a sign reversal the associated control signal is stored. Upon termination of the test the control signal is adjusted to values between the values found at the sign reversals.

It is to be noted that instead of a current and/or voltage analysis an analysis of the gap size variation during the test can be performed by means of suitable position sensors and analog-to-digital converters coupled thereto.

BRIEF DESCRIPTION OF THE DRAWINGS

These and other aspects of the invention will now be described and elucidated with reference to the accompanying drawings, in which.

DETAILED DESCRIPTION OF THE PREFERRED EMBODIMENT

Figure 1:
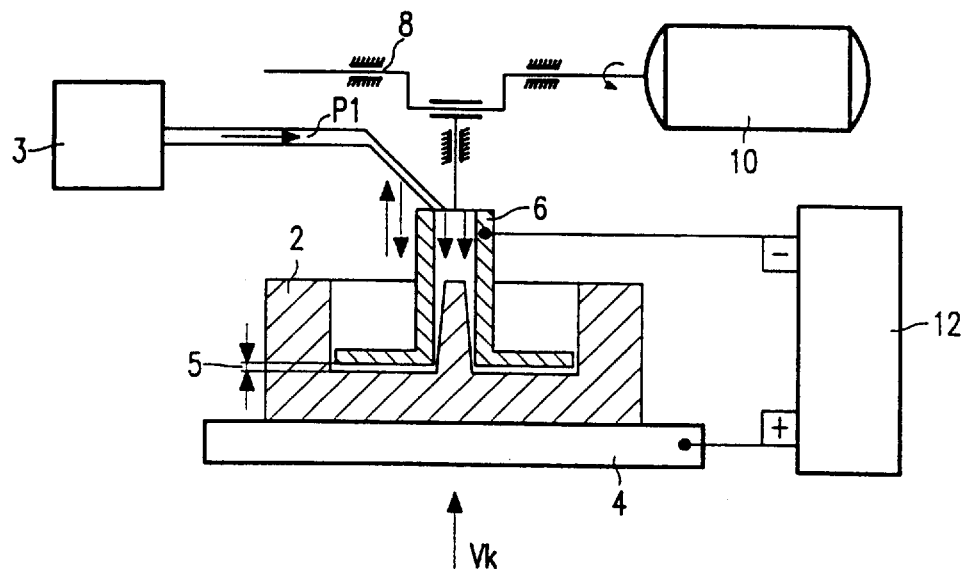
FIG. 1 shows diagrammatically an embodiment of a device for carrying out the method in accordance with the invention.

FIG. 1 shows a device for electrochemically machining a workpiece 2. The workpiece 2 is carried by a table 4 which moves with a feed rate Vk towards an electrode 6 which performs an oscillatory movement relative to the workpiece 2 by means of a crankshaft 8 which is driven by a motor 10. The workpiece is made of, for example, a chromium-containing steel. An electrolyte, for example an aqueous solution of nitrates of alkaline metals, flows in the gap 5 between the workpiece 2 and the electrode 6 and is circulated at a pressure $P_1$ from a reservoir 3. The workpiece 2, the table 4 and the electrode 6 are electrically conductive. The electrode 6 and the table 4 are connected to an electric power source 12 which supplies bipolar electric pulses to the electrode 6 and the table 4. The electric pulses comprise current pulses of normal polarity, for which the table 4, and consequently the workpiece 2, is positive relative to the electrode 6, which pulses alternate with voltage pulses of opposite polarity, for which the workpiece 2 is negative relative to the electrode 6. During the current pulses of normal polarity the metal of the workpiece 2 dissolves in the electrolyte, while at the same time passivation layers are formed on the surface of the workpiece 2. During the voltage pulses of opposite polarity the surface is depassivated. At the same time, the electrolyte in the vicinity of the workpiece 2 becomes alkaline owing to the generation of hydrogen from water. The high pH-value causes a reaction in which the passivation layer on the workpiece 2 dissolves.

Figure 2:
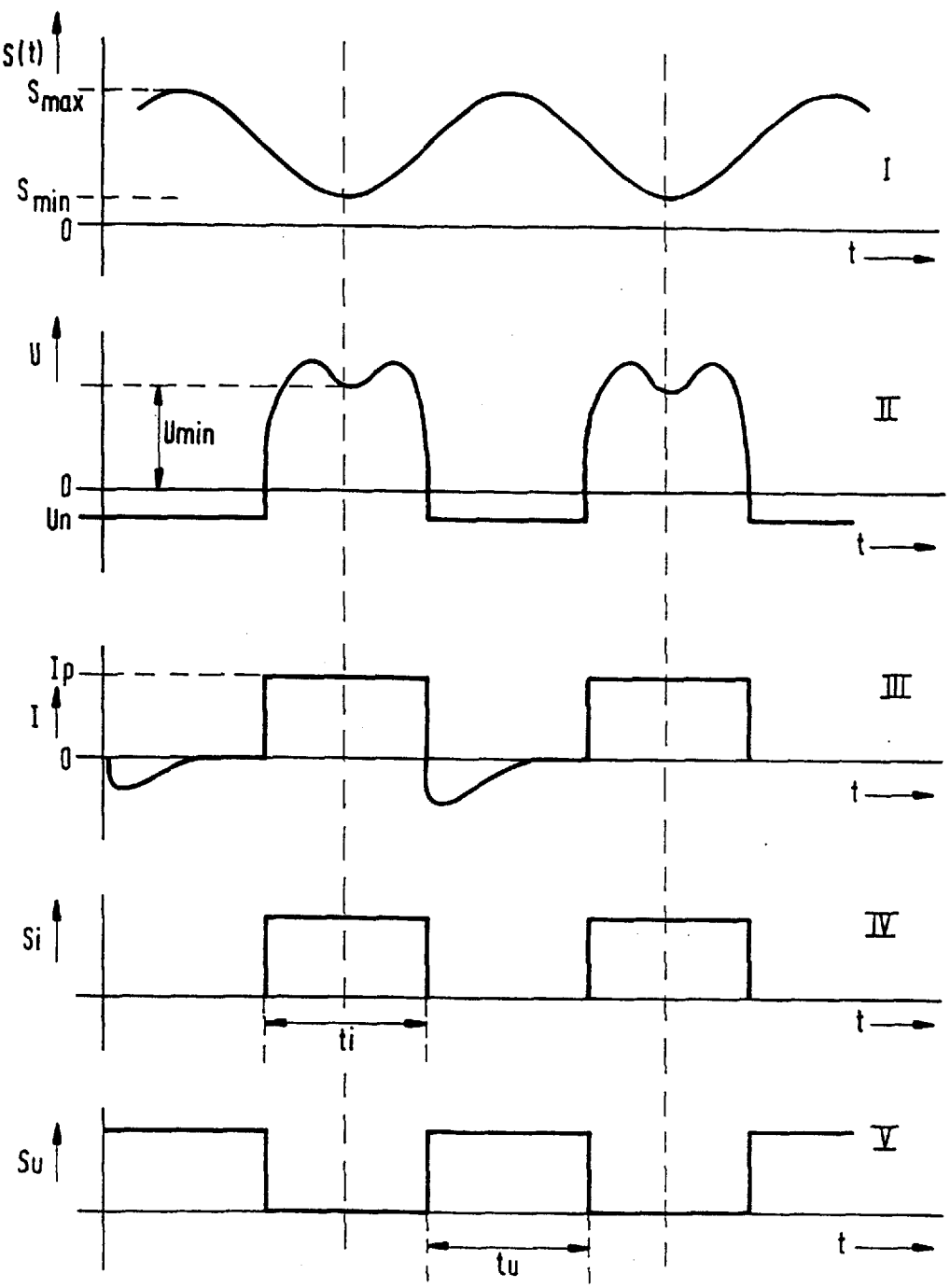
FIG. 2 shows waveforms of signals occurring in a variant of the method in accordance with the invention.

Curve I in FIG. 2 represents the variation of the size S(t) of the gap 5 between the electrode 6 and the workpiece 2. Curves II and III in FIG. 2 show the variation of the voltage U across the gap 5 and the current I through the gap 5, respectively.

Current pulses of normal polarity and amplitude Ip are applied in a time interval ti, indicated in curve IV of FIG. 2, in which the electrode 6 is disposed nearest the workpiece 2. During these current pulses the voltage across the gap 5 has a global minimum, as is shown in curve II of FIG. 2. The current pulses alternate with voltage pulses of opposite polarity and amplitude Un in a time interval tu, indicated in curve V of FIG. 2.

Figure 3:
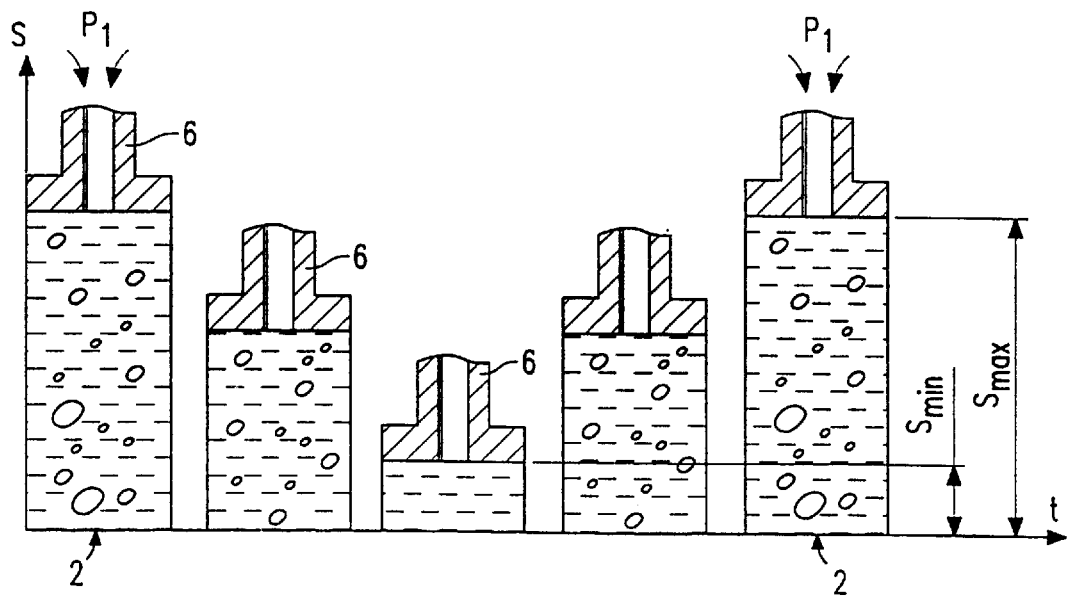
FIG. 3 represents the variation of the state of the electrolyte between the electrode and the workpiece while the variant of the method in accordance with the invention is carried out.
Figure 4:
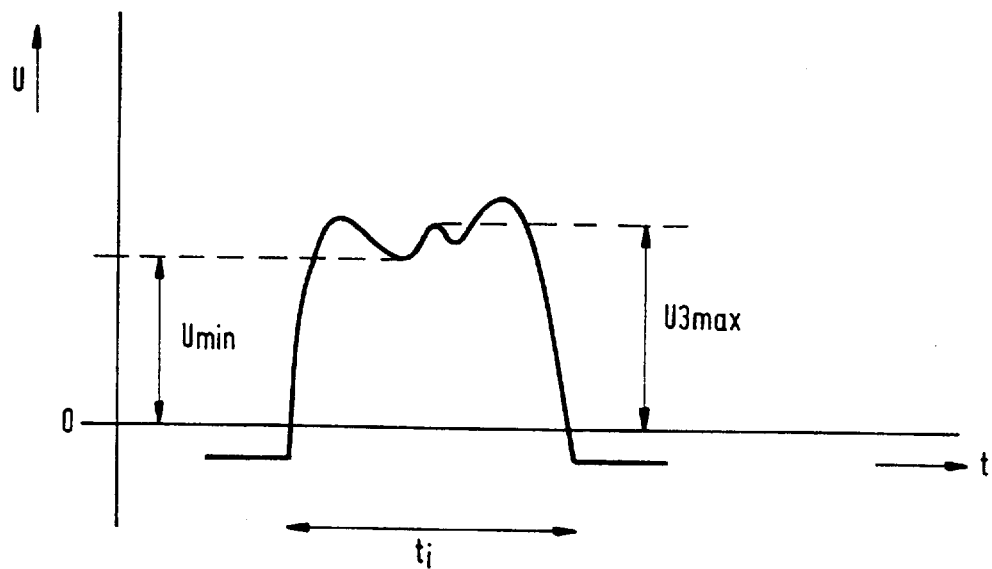
FIG. 4 shows a waveform of a signal which occurs in a variant of the method in accordance with the invention.

In the initial stage of approach of the electrode 6 to the workpiece 2 in the case of a comparatively large gap size Smax, see FIG. 3, the electrolyte flow is turbulent and the electrolyte contains vapor and gas bubbles. In this stage the space between the electrode 6 and the workpiece 2 has a comparatively high electrical resistance, which is apparent from the first maximum in the voltage U in curve II of FIG. 2. As a result of the approach of the electrode 6 the pressure in the electrolyte increases, causing the vapor and gas bubbles to dissolve so that the electrolyte is homogeneous and uniform in the gap and a high current density can be achieved with a small gap size. As a consequence, the electrical resistance decreases, which is apparent from the occurrence of a global minimum in the voltage U in curve II of FIG. 2. As a result of the increasing distance between the electrode 6 and the workpiece 2 and the renewed formation of vapor and gas bubbles the electrical resistance increases again to a second maximum as shown in curve II of FIG. 2. The application of electric power may be so large that the electrolyte begins to boil violently, giving rise to extra bubble formation in the gap. The extra bubble formation in the gap causes a temporary increase of the electrical resistance of the electrolyte, which manifests itself as a local maximum in the variation of the voltage U between the electrode and the workpiece during the current pulses. FIG. 4 shows in more detail the variation of the voltage U with the local maximum U3max, which occurs after the global minimum Umin.

Figure 5:
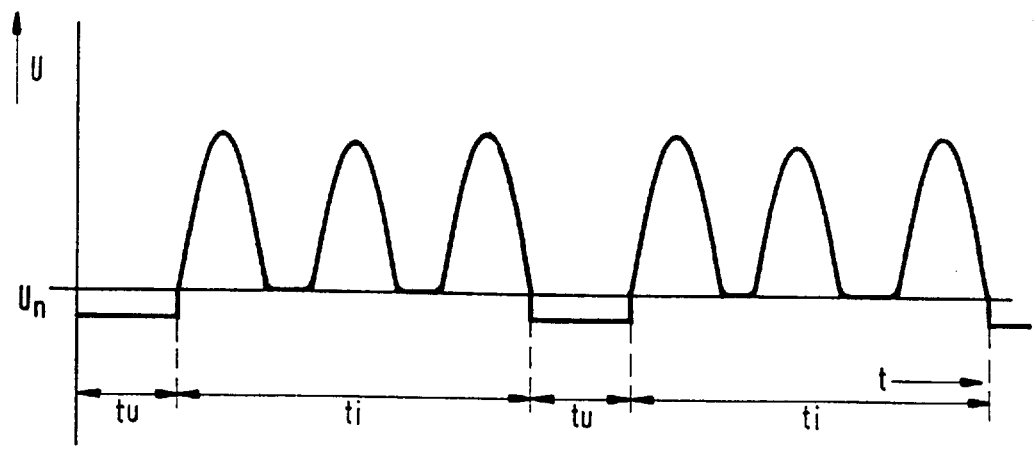
FIG. 5 shows a waveform of an alternative current pulse train for carrying out the method in accordance with the invention.

It is to be noted that such a violent bubble formation can be avoided by the application of groups of current pulses of normal polarity, which groups alternate with voltage pulses of opposite polarity. Such a bipolar pulse train is shown in FIG. 5. In this way, the process proceeds more steadily, yielding a more accurate result with the same minimum gap size.

Figure 6:
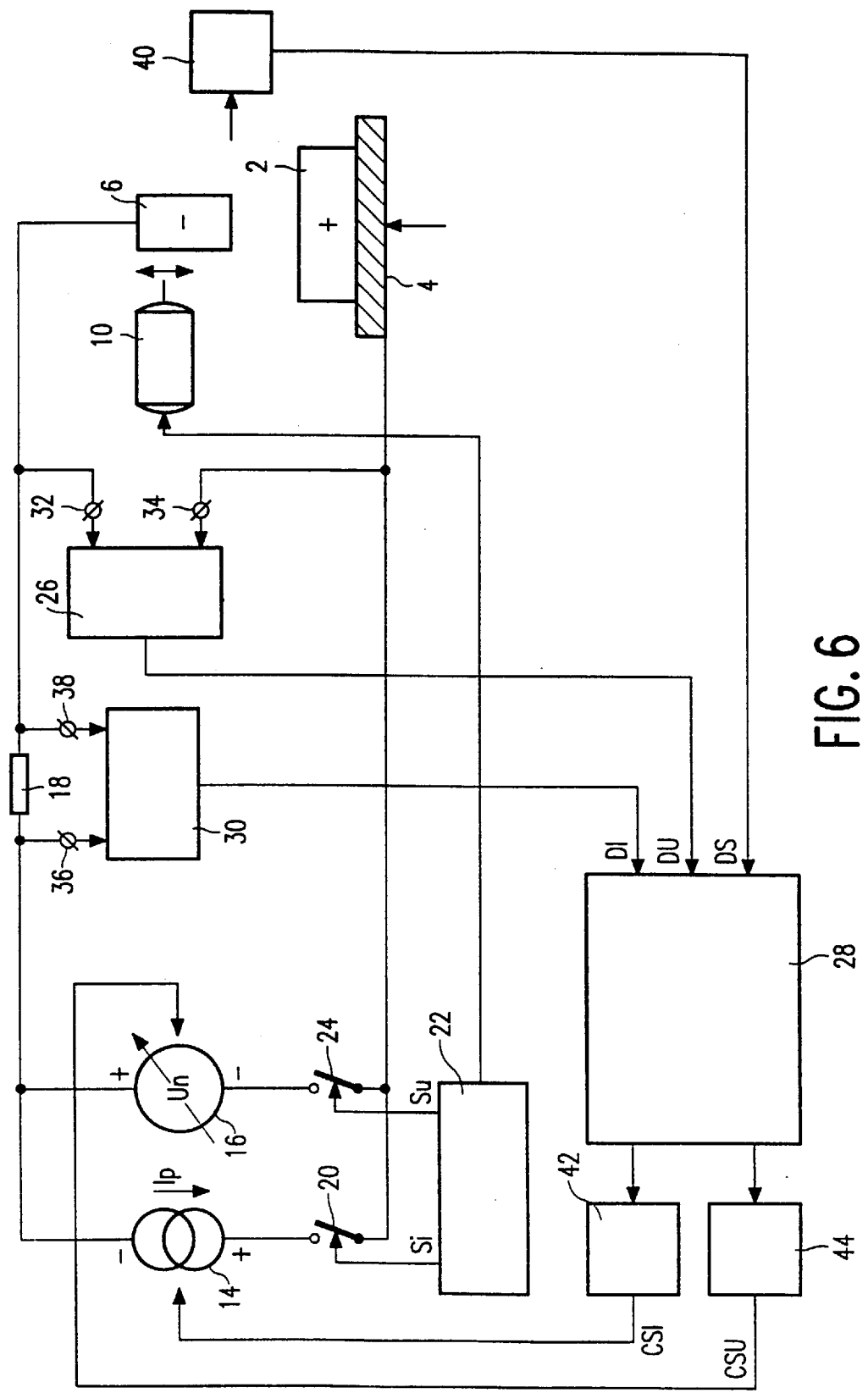
FIG. 6 shows an electrical block diagram of an embodiment of a device for carrying out the method in accordance with the invention.

FIG. 6 shows the electrical block diagram of an electrochemical machining device in accordance with the invention, including an electric power source 2 operating in accordance with the invention. The power source 12 comprises a current source 14, which supplies a current Ip whose magnitude is variable by means of a control signal CSI, and a variable voltage source 16, which supplies an output voltage Un which is variable by means of a control signal CSU. The negative terminal of the current source 14 and the positive terminal of the variable voltage source 16 are both connected to the electrode 6 via an optional series resistor 18. The positive terminal of the current source 14 is connected to the workpiece 2 via a switch 20. The switch 20 is closed at the time intervals ti (see FIG. 2) under control of a signal Si supplied by a synchronizing unit 22. The negative terminal of the variable voltage source 16 is connected to the workpiece 2 via a switch 24. The switch 24 is closed at the time intervals tu (see FIG. 2) under control of a signal Su, which is also supplied by the synchronizing unit 22, which also provides the synchronization of the motor 10. The analog voltage U between the electrode 6 and the workpiece 2 is measured at the terminals 32 and 34 by means of an analog-to-digital converter 26 and is converted into a digital signal DU, which is stored, analyzed and processed in a computer 28. If desired, the current I through the gap can also be measured by measuring the voltage drop across the series resistor 18 at terminals 36 and 38 by means of a second analog-to-digital converter 30, which converts the analog voltage drop into a digital signal DI, which is processed by the computer 28 in a manner similar to the digital signal DU. Instead of a series resistor 18 it is also possible to use a current transformer or any other suitable interface. The analog-to-digital converter 30 may be dispensed with if at the appropriate instants the input terminals of the analog-to-digital converter 26 are switched over from voltage measurement across the terminals 32 and 34 to current measurement across the terminals 36 and 38. The synchronizing unit 22, the analog-to-digital converters 26 and 30, and the computer 28 are supplied with clock pulses (not shown in FIG. 6), which ensure that the data acquisition and the data processing proceed in synchronism with the occurrence of the bipolar current pulses and the oscillation of the electrode. The position of the table 4 is monitored by means of a position sensor 40, which supplies a signal DS which is a measure of the displacement of the table 4. The computer 28 generates the control signal CSI for the current source 14 and the control signal CSU for the controllable voltage source 16 via suitable interfaces 42 and 44, which may be formed by, for example, digital-to-analog converters.

By controlling the feed rate Vk of the table 4 the gap 5 is adjusted in such a manner that a local maximum U3max occurs, as shown in FIG. 4. This local maximum can be determined by analysis of the voltage U with the aid of the analog-to-digital converter 26 and the computer 28 or with the aid of an oscilloscope. However, if desired any other operating point for the size of the gap 5 may be selected, i.e. also one for which no local maximum U3max occurs in the voltage U.

Figure 7:
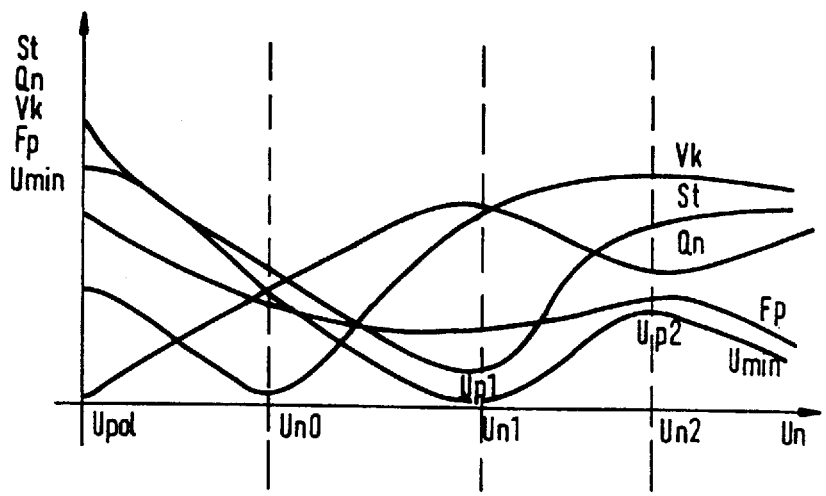
FIG. 7 shows the relationship between process parameters and the amplitude of the voltage pulses of opposite polarity while the method in accordance with the invention is carried out.

Experiments have shown that upon a change of the voltage Un of the voltage pulses of opposite polarity in the interval between the polarization voltage Upol and the voltage Un2 at which the electrode 6 begins to dissolve, the process being carried out under the given conditions, the value Umin (see FIG. 2, curve II) of the global minimum first passes through a minimum Umin=Up1 at an amplitude Un=Un1 and subsequently increases and passes through a maximum Umin=Up2 at an amplitude Un=Un2. This situation is illustrated in FIG. 7. The polarization voltage Upol is the voltage immediately after termination of a current pulses of normal polarity between the electrode 2 and the workpiece 6 if no pulses of opposite polarity are applied. See FIG. 8, curve I. The polarization voltage Upol decreases gradually to zero if no further current pulses are applied. In a first zone, where the voltage Un is between Upol and Un0, a dark oxide film is present on the surface of the workpiece 2. The voltage Un is then not yet adequate to depassivate this oxide film. In a second zone, where the voltage Un is between Un0 and Un1, the application of the voltage pulses of opposite polarity takes effect and the surface of the workpiece 2 becomes gradually brighter. In the following third zone, where the voltage Un is between Un1 and Un2, the feed rate Vk of the workpiece 2 may increase considerably because the dissolution process proceeds more efficiently without the oxide layer. The surface of the workpiece 2 is then given a high lustre, the average surface roughness $R_a$ being smaller than 0.1 $\mu$m. For chromium-containing steels the chromium content of the lustrous layer was found to be higher than in the case of a unipolar process. Moreover, the concentration of toxic hexavalent chromium ions in the waste electrolyte solution is reduced under these conditions. The value Un=Un1 results in an operating condition with a small gap size St and a uniform and bubble-free electrolyte, yielding a higher copying precision and a high dissolution rate of the workpiece, respectively. The electrode 6 begins to dissolve at the value Un=Un2, which is undesirable because it results in a reduced machining accuracy.

The voltage Un of the voltage pulses of opposite polarity is to be maintained within the limits Un1 and Un2 for an optimum effect. According to the invention these limits are determined by means of a test which precedes further treatment of the workpiece 2. For this purpose, the voltage Un is gradually increased under the given operating conditions from a starting value equal to the polarization voltage $Un=Upol$ to a final value not greater than a voltage $Un=Unmax$, at which the electrode begins to dissolve. Between two successive current pulses the voltage $Un$ is incremented by a step $\Delta Un$. For each current pulse the voltage $Umin$ is measured and the difference with the $Umin$ of the preceding current pulse is calculated. If a first sign reversal occurs in this difference this yields the value $Un=Un1$ of the graph in FIG. 7. If after a plurality of pulses a second sign reversal occurs in the difference the value $Un=Un2$ is obtained. In the case of a comparatively small step size $\Delta Un$ a measurable change in the voltage value $Umin$ of successive global minima will generally occur only after a comparatively large number of current pulses. In that case a number of successive voltage values of the global minima will have to be compiled and averaged in order to allow a sign reversal to be detected with satisfactory accuracy. This can be achieved by suitably programming the computer 28. A comparatively large step size will generally yield a measurable sign reversal between two successive pulses. The optimum step size depends on the desired accuracy for the limits $Un1$ and $Un2$ of the amplitude $Un$ of the voltage pulses.

The method will now be explained by describing a number of steps to be traversed.

Step 1: Selecting the operating conditions of the process

The given operating conditions are, for example, those described in relation to the signal waveform shown in FIG. 4, i.e. an oscillatory movement between the electrode 6 and the workpiece 2 and the occurrence of a local maximum $U3max$ in the global minimum of the voltage $U$ across the gap 5. However, operating conditions with different gap sizes and without an oscillatory movement are likewise possible, such as a constant feed rate $Vk$ of the workpiece 2 which is approximately equal to the dissolution rate of the workpiece 2, so that the gap size remains substantially constant.

Step 2: Measuring the polarization voltage $Upol$

Figure 8:
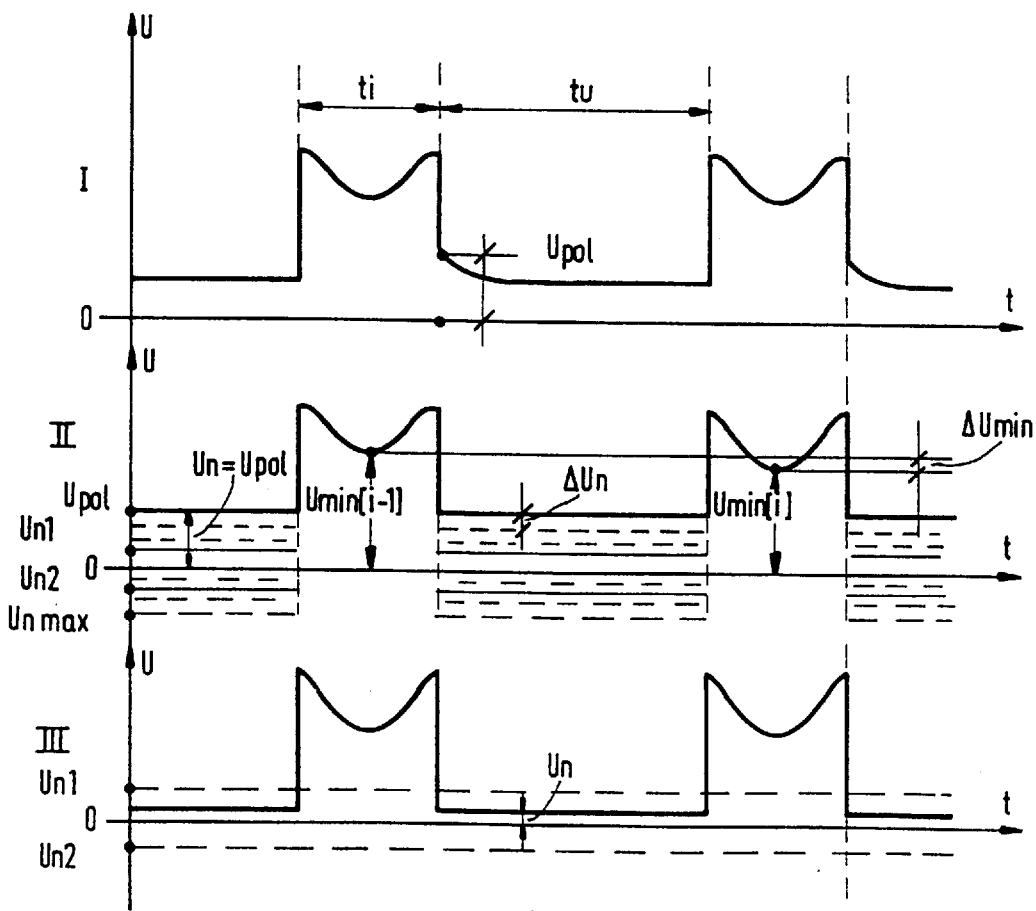
FIG. 8 shows waveforms of the voltage occurring between the electrode and the workpiece while a variant of the method in accordance with the invention is carried out.

During the test the voltage $Un$ will be incremented from the value $Un=Upol$, as shown in curve II of FIG. 8. In order to enable the magnitude of the polarization voltage $Upol$ to be determined a number of unipolar pulses is applied before the test, i.e. the switch 24 in FIG. 6 is not closed in the time intervals $tu$ between the current pulses of normal polarity in the time intervals $ti$. The voltage across the gap 5 then varies as represented in curve I of FIG. 8. The value of the polarization voltage $Upol$ is measured and stored by means of the analog-to-digital converter 26 and the computer 28.

Figure 9:
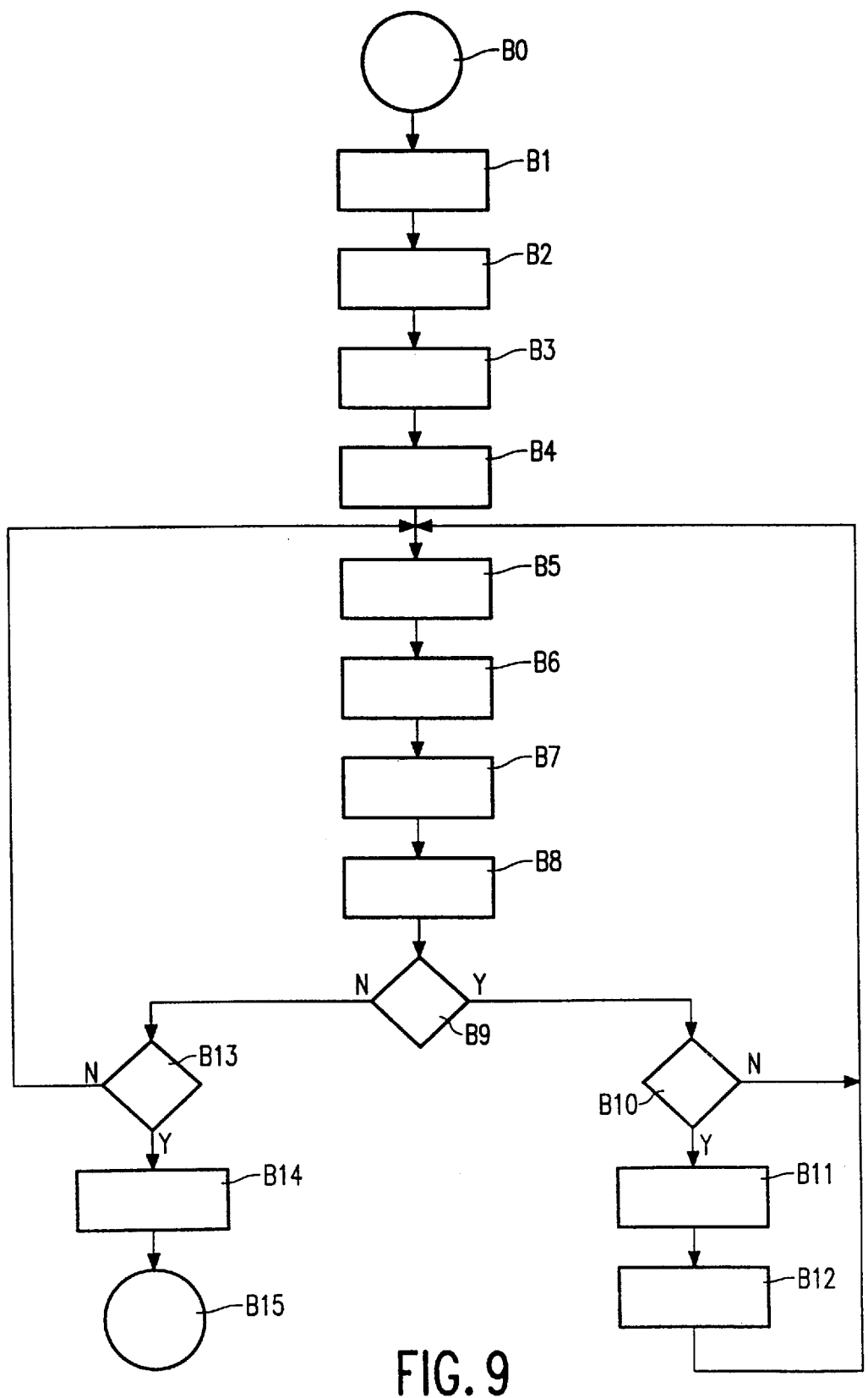
FIG. 9 is a flow chart of one of the process steps of the method in accordance with the invention.

Step 3: Carrying out the test to determine the limits $Un1$ and $Un2$ of the voltage $Un$ FIG. 9 shows the flow chart of the test procedure carried out by the computer 28 in response to the measured voltages. The blocks in FIG. 9 have the following inscriptions:

B0: Start
B1: $Un=Upol$
B2: Flag=TRUE
B3: $Umin[0]=$
B4: $i=1$
B5: $Un=Un+\Delta Un$
B6: measure $Umin[i]$
B7: $\Delta Umin=Umin[i-1]-Umin[i]$
B8: $i=i+1$
B9: Flag=TRUE?
B10: $\Delta Umin<0$?
B11: Flag=FALSE
B12: $Un1=Un$
B13: $\Delta Umin>0$?
B14: $Un2=Un$
B15: End A counter $i$ keeps tally of the sequence number of the current pulses. $Umin[i]$ is the measured value $Umin$ during the $i^{th}$ current pulse.

In block B1 the initial value $Upol$ measured in Step 2 is assigned to the variable $Un$. The computer 28 supplies a suitable control signal $CSU$ to the variable voltage source 16 via the digital-to-analog converter 44, as a result of which the output voltage $Un$ of this voltage source becomes equal to $Upol$. In block B2 the value TRUE is assigned to a boolean variable Flag. In block B3 the value of $Umin[0]$ is set to 0. In block B4 the counter is set to 1. After this initialization the voltage $Un$ is incremented in block B5, the computer 28 each time supplying a corresponding control signal $CSU$ to the variable voltage source 16. During the next current pulse the voltage $Umin$ is measured in block B6. Subsequently, in block B7 the difference between the $Umin$ of the previous current pulse and the present current pulse is calculated. In block B8 the counter is incremented by 1 for a subsequent measurement. In block B9 the Flag is tested. The Flag has been given the value TRUE in block B2. Thus, the first time block B10 will be carried out to ascertain whether a sign reversal occurs in the difference calculated in Block B7 or, in other words, whether the difference is smaller than 0. If this is not the case, the program returns to block B5. If the difference is smaller than 0, block B11 is carried out, in which the variable Flag is set to FALSE. In block B12 the instantaneous value of $Un$ prevailing during the sign reversal is stored in a variable $Un1$. Subsequently, the program returns to block B5. Since the Flag has now been given the value FALSE block B13 will be carried out after the test in block B9. Block B13 checks whether there is an opposite sign reversal in the difference calculated in block B7 or, in other words, whether the difference is greater than 0. If this is not the case, the program returns to block B5. If the difference is greater than 0, block B14 is carried out, in which the instantaneous value of $Un$ prevailing during the second sign reversal is stored in a variable $Un2$. After this, the test is terminated in block B15. This process is illustrated in curve II of FIG. 8, which shows the voltage $U$ for two successive current pulses $[i-1]$ and $[i]$.

Step 4: Interruption of the operation

After the test the operation can be interrupted to determine the choice in Step 5.

Step 5: Selecting the operating voltage $Un$ with the limits $Un1$ and $Un2$ thus found. The voltage $Un$ is now set to a value between the values $Un1$ and $Un2$ found during the test. The values $Un1$ and $Un2$ have been stored in the memory of the computer 28. By means of suitable software it is now possible to set the control voltage $CSU$ via the digital-to-analog converter 42 to a value corresponding to the selected value of $Un$ within the limits $Un1$ and $Un2$.

Step 6: Proceeding with the machining process

Machining is now continued under the given conditions and with the selected voltage $Un$. Curve III in FIG. 8 represents the variation of the voltage $U$ during the bipolar pulses. Machining now proceeds until the table 4 has undergone a predetermined displacement. This displacement is measured with the position sensor 40 (see FIG. 6).

Step 7: Stopping of the machining process

Machining is stopped when the predetermined displacement of the table 4 is reached. After this, pulsing is stopped.

When chromium-containing steel is electrochemically machined in an electrolyte based on an aqueous solution of nitrates of alkaline metals in accordance with the above method this yields an effect in which the voltage pulse of opposite polarity gives rise to a forced electric discharge of the polarization in the surface of the workpiece and, as a result of the release of active atomic hydrogen onto the workpiece surface to be machined, a reduction of the metal oxides in the oxide film on the workpiece and of the ions (including bichromate ions $Cr_2O_7^{2-}$) situated in the electrical double layer of the workpiece.

In general, the following chemical reactions can take place on the chrome steel surface to be machined when bipolar pulses are used:

For iron:

$$Fe + H_2O \rightarrow Fe(OH) + \bar{e} + H^+$$

$$Fe(OH) \rightarrow Fe(OH)^+ + e$$

$$Fe(OH)^+ + NO_3^- \rightarrow Fe(OH)NO_3$$

For chromium:

$$2Cr + 7H_2O \rightarrow Cr_2O_7^{2-} + 14H^+ + 12e$$

$$2Cr + 3H_2O \rightarrow Cr_2O_3 + 6H^+ + 6e$$

$$Cr_2O_3 + 4H_2O \rightarrow Cr_2O_7^{2-} + 8H^+ + 6e$$

$$Cr + 3H_2O \rightarrow CrO_3 + 6\bar{e} + 6H^+$$

In the case of anode polarization this results in the following oxides being formed on the surface to be machined:

$$FeO, Fe_2O_3, Cr_2O_3, CrO_3.$$

In the case of cathode polarization the following reaction takes place on the workpiece surface to be machined:

$$2H_2O + 2\bar{e} \rightarrow 2H + 2OH^-$$

The active hydrogen atom produced from water reduces the surface oxides in accordance with the following reactions:

$$2H + FeO \rightarrow Fe + H_2O$$

$$2H + Fe_2O_3 \rightarrow 2FeO + H_2O$$

$$Cr_2O_3 + 2H \rightarrow 2CrO + H_2O$$

$$CrO + 2H \rightarrow Cr + H_2O$$

$$2CrO_3 + 6H \rightarrow Cr_2O_3 + 3H_2O$$

and the anions ($Cr_2O_7^{2-}$) in accordance with:

$$Cr_2O_7^{2-} + 8H \rightarrow Cr_2O_3 + 4H_2O.$$

The choice of the voltage of the pulses of opposite polarity is based on the following considerations. The amplitude of the voltage pulse of opposite polarity should not be so large that the electrode begins to dissolve and the integral amount of charge Qn should not give rise to a critical alkalization value of the surface layer of the workpiece at which passivation processes can start. The required duration tu of a pulse of opposite polarity is determined by the amount of charge Qn necessary to release hydrogen to an extent which is adequate for the development of the reduction reactions in the oxide layer.

When groups of current pulses of normal polarity are used, which groups alternate with voltage pulses of opposite polarity, as shown in FIG. 5, it is generally not possible to measure Umin when the test for determining Un1 and Un2 is carried out. Instead of Umin it is also possible to calculate the integral Fp (see FIG. 7) of the voltage U across the gap during the time interval ti as an alternative parameter. The difference in successive values of this integral Fp exhibits sign reversals of a kind similar to those in Umin. It is also possible to integrate over subintervals of the time interval ti. The measurement of the integral Fp is particularly useful in electrochemical machining methods in which no oscillatory movement is performed between the electrode and the workpiece, such as for example a machining method with a constant of feed rate Vk of the workpiece 2, which is approximately equal to the dissolution rate of the workpiece 2, so that the gap size remains substantially constant.

A further alternative parameter is the integral Qn (see FIG. 7) of the current I which flows during the time intervals tu, i.e. during the voltage pulses of opposite polarity. This current I is shown in curve III of FIG. 2. The integral Qn represents the amount of charge consumed during the voltage pulses of opposite polarity. The current I is measured by means of the series resistor 18 and the analog-to-digital converter 30 and is integrated in the computer 28 (see FIG. 6). As is apparent from FIG. 7, the integral Qn exhibits a maximum at Un=Un1 and a minimum at Un=Un2, in contrast with the parameter Umin, which has a minimum at Un=Un1 and a maximum at Un=Un2. This means that if the integral Qn is used as the parameter the sign reversals during the test will be directed oppositely. Block B10 in the flow chart of FIG. 9 should then ascertain whether ΔQn is greater than 0 and block B13 whether ΔQn is smaller than 0. The measurement of the integral of the current which flows during the voltage pulses of opposite polarity is again a parameter which is suitable for electrochemical machining methods in which no oscillatory movement is performed between the electrode and the workpiece.

Still other parameters which are measures of the behavior of the medium in the gap and the chemical processes in the electrode and the workpiece are the resistance across the gap and the gap size St (see FIG. 7). The resistance can be found by measuring both the voltage U and the current I during the time intervals ti of the current pulses. As is apparent from FIG. 7, the gap size St has a minimum at Un=Un1, just like Umin. By measuring the gap size it is possible to detect a sign reversal.

The method described above was carried out with a workpiece and an electrode both of annealed steel. The surface area of the workpiece was 0.3 cm$^2$; the electrolyte was an aqueous solution of 8 percent by weight of NaNO$_3$; the current density of the current pulses of normal polarity was 80 A/cm$^2$; the duration ti was 3 ms; the electrolyte pressure was 0.7*10$^5$ Pa; the temperature of the electrolyte was 20° C.; the oscillation frequency of the electrode was 47 Hz; the oscillation amplitude was 0.2 mm; the waveform of the current pulses of normal polarity was rectangular (see FIG. 2, curve III); and the waveform of the voltage pulses of opposite polarity was also rectangular (see FIG. 2, curve II). The gap size St as a function of time was controlled in such a manner that a local maximum occurred (see FIG. 4) in the voltage between the electrode and the workpiece. During the test described above the voltage Un of the pulses of opposite polarity was changed from a voltage equal to the polarization voltage Upol=+2.3 V to the voltage (−0.8 V) at which the electrode began to dissolve. The value Umin of the global minimum was used as the parameter for detecting the sign reversals. The upper limit Un1 was found to be +0.05 V and the lower limit Un2 was found to be −0.6 V. Subsequently, machining was continued while maintaining the voltage Un within the limits found.

As an alternative, the electrode 6 may be tapped against the workpiece 2, after which the gap size is adjusted. During machining the gap size is adapted so as to obtain a substantially constant average feed rate Vk which is substantially equal to the dissolution rate of the workpiece 2.

Disclosed is a method of electrochemically machining an electrically conductive workpiece in an electrolyte by applying bipolar electric pulses between the workpiece and an electrically conductive electrode, one or more current pulses of normal polarity alternating with voltage pulses of opposite polarity. The amplitude of the voltage pulses is adjusted between two predetermined values derived from the occurrence of a given surface quality of the workpiece and the occurrence of wear of the electrode. The derivation is effected by means of at least one test which precedes the machining of the workpiece. During the test the amplitude of the voltage pulses is increased gradually from an initial value to a final value. The two predetermined values are determined upon the occurrence of a sign reversal in the difference between successive values of a parameter which is representative of a property of a gap between the electrode and the workpiece. The parameter may be the amplitude of a global minimum in the voltage across the gap during the current pulses, which global minimum results from an oscillatory movement of the workpiece and the electrode relative to one another. The parameter may also be the integral of the current across the gap during the voltage pulses; or the integral of the voltage across the gap during the current pulses; or the resistance across the gap; or the size of the gap.

We claim:

1. A method of electrochemically machining an electrically conductive workpiece in an electrolyte by applying bipolar electric pulses between the workpiece and an electrically conductive electrode, one or more current pulses of normal polarity being alternated with voltage pulses of opposite polarity, wherein the amplitude of the voltage pulses is adjusted between two predetermined values derived from the occurrence of a given surface quality of the workpiece and the occurrence of wear of the electrode, such derivation being effected by means of at least one test which precedes the machining of the workpiece.

2. A method as claimed in claim 1, wherein during the test, the amplitude of the voltage pulses is increased gradually from an initial value to a final value, and the two predetermined values are determined upon a sign reversal in the difference between successive values of a parameter which, in operation, is representative of a property of a gap between the electrode and the workpiece.

3. A method as claimed in claim 2, wherein the initial value of the amplitude substantially corresponds to the polarization voltage between the workpiece and the electrode after termination of the current pulses.

4. A method as claimed in claim 3, wherein the parameter is the amplitude (Umin) of a global minimum in the voltage across the gap (5) during the current pulses, the global minimum resulting from an oscillatory movement of the workpiece (2) and the electrode (6) relative to each other.

5. A method as claimed in claim 3, wherein the parameter is the integral (Qn) of the current across the gap (5) during the voltage pulses.

6. A method as claimed in claim 3, wherein the parameter is the integral (Fp) of the voltage across the gap (5) during the current pulses.

7. A method as claimed in claim 3, wherein the parameter is the resistance across the gap (5).

8. A method as claimed in claim 3, wherein the parameter is the size (St) of the gap (5).

9. A method as claimed in claim 2 wherein the final value of the amplitude is not greater than the amplitude at which the electrode starts to dissolve in the electrolyte.

10. A method as claimed in claim 9, wherein the parameter is the amplitude (Umin) of a global minimum in the voltage across the gap (5) during the current pulses, the global minimum resulting from an oscillatory movement of the workpiece (2) and the electrode (6) relative to each other.

11. A method as claimed in claim 9, wherein the parameter is the integral (Qn) of the current across the gap (5) during the voltage pulses.

12. A method as claimed in claim 9, wherein the parameter is the integral (Fp) of the voltage across the gap (5) during the current pulses.

13. A method as claimed in claim 9, wherein the parameter is the resistance across the gap (5).

14. A method as claimed in claim 9, wherein the parameter is the size (St) of the gap (5).

15. A method as claimed in claim 2 wherein the parameter is the amplitude of a global minimum in the voltage across the gap during the current pulses, the global minimum resulting from an oscillatory movement of the workpiece and the electrode relative to each other.

16. A method as claimed in claim 15 wherein the first one of the predetermined values is determined upon a first sign reversal from minus to plus, and the second one of the predetermined values is determined upon a subsequent second sign reversal from plus to minus.

17. A method as claimed in claim 15, wherein the size of the gap between the electrode and the workpiece is controlled in such a manner that, during the current pulses, a local maximum occurs in the voltage between the workpiece and the electrode.

18. A method as claimed in claim 15, wherein the oscillatory movement of the workpiece and the electrode relative to each other is synchronized with the occurrence of the current pulses.

19. A method as claimed in claim 2 wherein the parameter is the integral of the current across the gap during the voltage pulses.

20. A method as claimed in claim 19, wherein the first one of the predetermined values is the value which occurs upon a first sign reversal from plus to minus and the second one of the predetermined values is the value which occurs upon a subsequent second sign reversal from minus to plus.

21. A method as claimed in claim 2 wherein the parameter is the integral of the voltage across the gap during the current pulses.

22. A method as claimed in claim 21, wherein the first one of the two predetermined values is determined upon a first sign reversal from minus to plus, and the second one of the two predetermined values is determined upon a subsequent second sign reversal from plus to minus.

23. A method as claimed in claim 2 wherein the parameter is the resistance across the gap.

24. A method as claimed in claim 2 wherein the parameter is the size of the gap.

25. A method as claimed in claim 24, wherein during the test, in succession, the amplitude of the voltage pulses is increased, the size of the gap between the workpiece and the electrode is measured, the difference between the measured values for a subsequent and a previous value of the gap size is computed, the amplitude of the voltage pulses is determined upon the occurrence of a sign reversal in this difference, and subsequently machining is continued with the amplitude thus determined.

26. A method as claimed in claim 1 wherein the workpiece is made of a chromium-containing steel.

27. A method as claimed in claim 1 wherein the electrolyte is an aqueous solution of at least one nitrate of at least one alkali metal.

28. A device for electrochemically machining an electrically conductive workpiece in an electrolyte by applying bipolar electric pulses between the workpiece and an electrically conductive electrode, one or more current pulses of normal polarity being alternated with voltage pulses of opposite polarity, wherein the device comprises:

an electrode;

means for locating the electrode and the workpiece in spaced relationship so as to keep a gap therebetween;

means for feeding electrolyte into the gap between the electrode and the workpiece;

a current source, electrically connectable to the workpiece and the electrode, for supplying the current pulses to the workpiece and the electrode;

a voltage source with controllable output voltage, electrically connectable to the workpiece and the electrode, for supplying the voltage pulses to the workpiece and the electrode;

means for alternately connecting the current source and the voltage source to the workpiece and the electrode;

means for generating a control signal for gradually changing the output voltage of the voltage source;

means for analyzing and storing the voltage and/or current waveforms of the pulses between the workpiece and the electrode;

means for detecting a sign reversal in the difference between successive values of a parameter derived from the voltage waveform or the current waveform of the pulses, or from the resistance across the gap between the electrode and the workpiece;

means for storing the instantaneous value of the control signal of the voltage source upon detection of the sign reversal.

29. A device as claimed in claim 28, wherein the means for analyzing and storing comprises an analog-to-digital converter for digitizing the voltage waveform or the current waveform of the pulses.

30. A device as claimed in claim 29, wherein the device comprises means (8, 10) for producing an oscillatory movement between the electrode (6) and the workpiece (2) and means (22) for synchronizing the means (20, 24) for alternately connecting the current source (14) and the voltage source (16) with the oscillatory movement.

31. A device as claimed in claim 28 wherein the device comprises means for producing an oscillatory movement between the electrode and the workpiece and means for synchronizing the means for alternately connecting the current source and the voltage source with the oscillatory movement.

32. An electric power supply for use in a method of electrochemically machining an electrically conductive workpiece in a electrolyte by applying bipolar electric pulses between the workpiece and an electrically connective electrode, one or more current pulses of normal polarity being alternated with voltage pulses of opposite polarity, wherein the electric power supply comprises:

a current source, electrically connectable to the workpiece and the electrode, for supplying the current pulses to the workpiece and the electrode;

a voltage source with controllable output voltage, electrically connectable to the workpiece and the electrode, for supplying the voltage pulses to the workpiece and the electrode;

means for alternately connecting the current source and the voltage source to the workpiece and the electrode;

means for generating a control signal for gradually changing the output voltage of the voltage source;

means for analyzing and storing the voltage and/or current waveforms of the pulses between the workpiece and the electrode;

means for detecting a sign reversal in the difference between successive values of a parameter derived from the voltage waveform or the current waveform of the pulses, or from the resistance of a gap across the electrode and the workpiece;

means for storing the instantaneous value of the control signal of the voltage source upon detection of the sign reversal.

* * * * *